United States Patent [19]
McGunigle

[11] 3,819,919
[45] June 25, 1974

[54] TRACKING SYSTEM FOR TIME-DISPLACED SIGNALS

[76] Inventor: Richard D. McGunigle, 2501 W. Sunflower, Apt. L2, Santa Ana, Calif.

[22] Filed: Dec. 8, 1972

[21] Appl. No.: 313,226

[52] U.S. Cl...... 235/151.34, 73/194 E, 235/150.53, 235/181
[51] Int. Cl......................... G06f 15/20, G06f 15/34
[58] Field of Search.......... 235/181, 151.34, 150.53; 73/194 E, 194 F

[56] References Cited
UNITED STATES PATENTS

| | | | |
|---|---|---|---|
| 3,303,335 | 2/1967 | Pryor................................. | 235/181 |
| 3,419,867 | 12/1968 | Pifer ................................... | 235/181 |
| 3,558,898 | 1/1971 | Block et al.......................... | 235/181 |
| 3,595,078 | 7/1971 | Beck et al. ........................ | 73/194 F |
| 3,624,562 | 11/1971 | Fujimura............................. | 235/181 |
| 3,635,082 | 1/1972 | Prellwitz et al. .................. | 73/194 E |
| 3,639,695 | 2/1972 | Bertheas............................. | 235/181 |
| 3,660,647 | 5/1972 | Pryor, Jr. ............................ | 235/181 |

FOREIGN PATENTS OR APPLICATIONS

| | | | |
|---|---|---|---|
| 1,473,006 | 3/1967 | France............................... | 235/181 |

OTHER PUBLICATIONS

Matthes et al.: Measurement of the Velocity of Gas Bubbles in Water by a Correlation Method. The Review of Scientific Instr. Vol. 41 – No. 6 June 1970.

*Primary Examiner*—Felix D. Gruber
*Attorney, Agent, or Firm*—Nilsson, Robbins, Bissell, Dalgarn & Berliner

[57] ABSTRACT

An automatic tracking correlator is disclosed for measuring the time delay between two input signals by crosscorrelation. Values of one signal are registered until a similar pattern is detected in the other signal. As disclosed, a simple, economical correlation circuit is utilized incorporating analog-digital converters and variable-delay shift registers. An embodiment of the system is disclosed for the measurement of flow or velocity.

8 Claims, 4 Drawing Figures

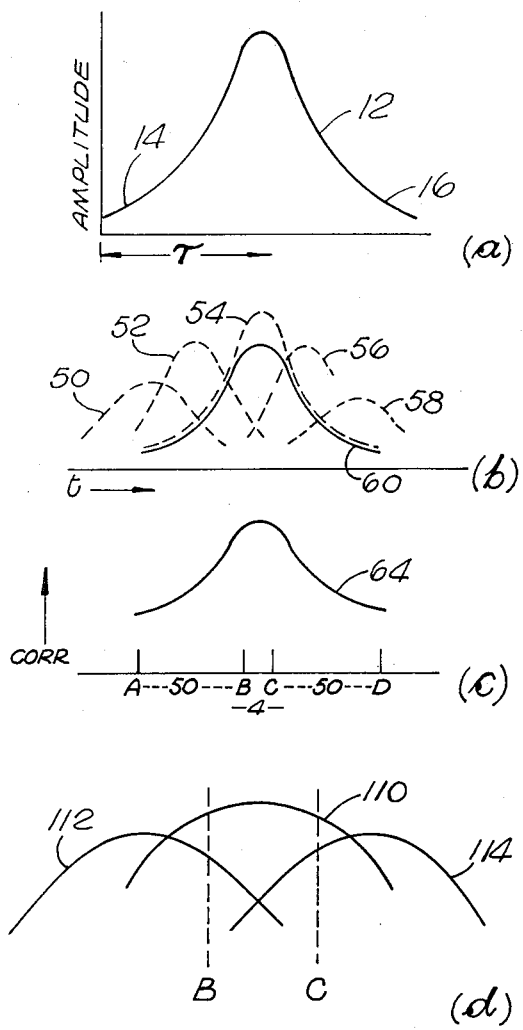
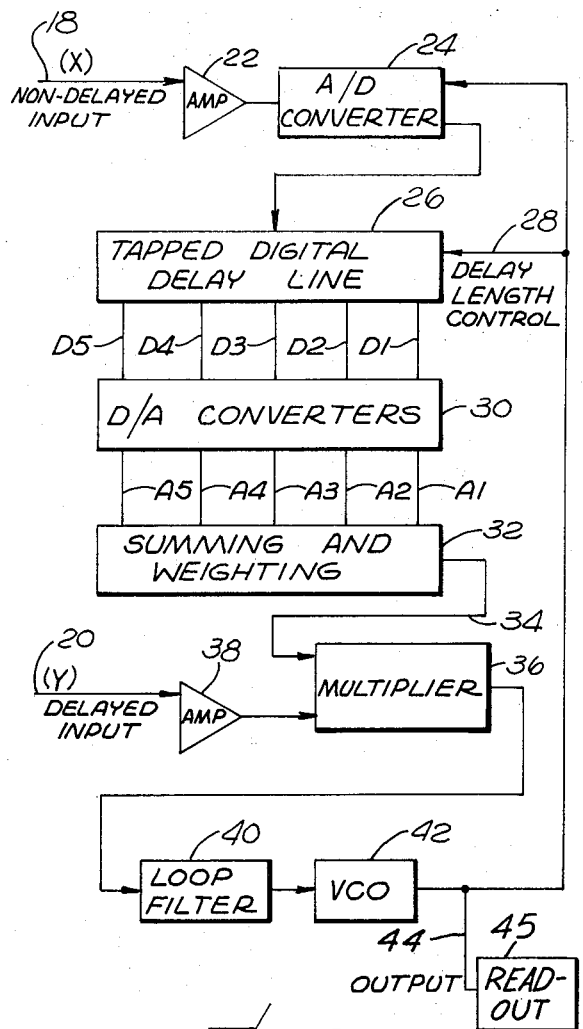
Fig.1.
Fig.2.
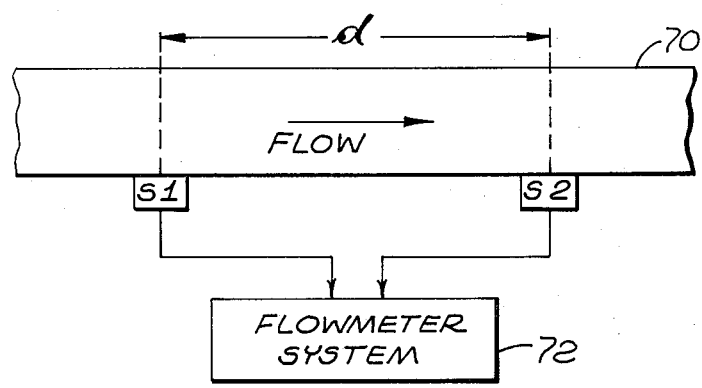
Fig.3.

TRACKING SYSTEM FOR TIME-DISPLACED SIGNALS

BACKGROUND AND SUMMARY OF THE INVENTION

Although the principles of correlation have long been known, only in relatively recent times have these techniques been applied to practical analysis and measurement problems. In general, the present invention is directed to a system utilizing the principles of correlation to accomplish tracking operations. That is, the system provides an output signal that is indicative of the time delay between input signals. Somewhat inherently, in the operation of the present system, the frequency of the output signal is inversely proportional to the time delay between the two input signals. As the system can also yield amplitude information, it is capable of measuring the amount of correlation present between two input signals. Therefore, it can be employed to automatically compute the maximum value of the crosscorrelation function. Other capabilities include computation of the entire correlation function and signal averaging. Because of the system's broad range of capabilities, it is suited to a wide range of different applications; however, a specific disclosed embodiment is directed to a flowmeter.

In some applications, the need arises for a flowmeter that will not effect the flowing field, as: by the placement of elements in the stream, by distortions or discontinuities in the walls of the duct containing the flow or by the introduction of foreign particles into the stream. Generally, various techniques have been previously proposed for accomplishing such a flowmeter, including Doppler-shift techniques, heat-transfer techniques and electromagnetic techniques. Generally, Doppler systems tend to be complex and require special windows in addition to being somewhat sensitive to variations in the flow medium. Heat-transfer devices are generally dependent upon the mass and thermal properties of the media in the stream under observation and, accordingly, tend to present certain difficulties. Time constants also tend to limit the response of such systems. Finally, electromagnetic flowmeters, in various forms, have been proposed; however, generally magnetic assemblies become rather large with increases in the size of the duct carrying the stream and additionally electrodes normally must be in contact with the stream medium which may present compatibility problems. Consequently, as suggested above, various difficulties have been presented in each of these prior systems for measuring flow.

Generally, in accordance herewith, the velocity of a fluid stream is measured by monitoring and registering variations in the flow stream at a a specific point, then sensing the interval that passes until the same variations occur at a predetermined down-stream point. The flow variations can be turbulence, density variations, or a wide variety of other naturally occurring fluctuations. Alternatively, in streams where these are not naturally present, they can be induced. The flowmeter, as disclosed herein and embodying the automatic tracking system, operates in real time, continuously monitoring two spaced-apart sensors and seeking the time delay that represents the maximum correlation between the two signals. Thus, the system simply provides a measurement of the time delay for maximum correlation. As a matter of convenience, the information is available as a frequency, linearly proportional to the flow velocity. However, as disclosed herein in detail, the measurement may be manifest by other signal forms.

BRIEF DESCRIPTION OF THE DRAWINGS

In the drawings, which constitute a part of this specification, exemplary embodiments exhibiting various objectives and features hereof are set forth, specifically:

FIG. 1 shows various curves referred to in the explanation of the disclosed embodiments;

FIG. 2 is a block diagram of an automatic tracking system constructed in accordance herewith;

FIG. 3 is an introductory block diagram of a flowmeter constructed in accordance herewith.

DESCRIPTION OF THE ILLUSTRATIVE EMBODIMENTS

Figure 4:
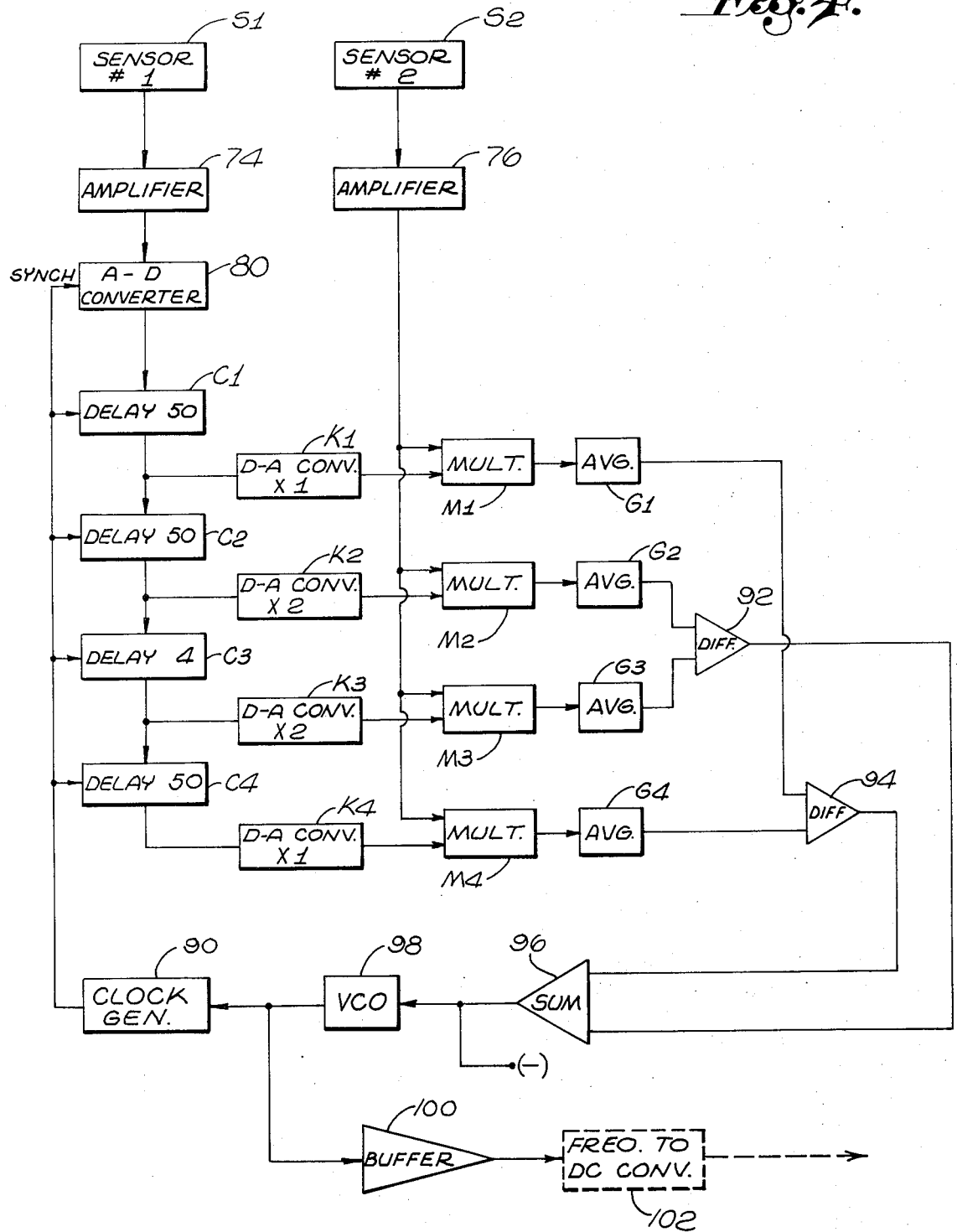
FIG. 4 is a detailed block diagram of the system of FIG. 3.

As required, detailed illustrative embodiments of the invention are disclosed herein. The embodiments merely exemplify the invention which may be constructed in various other forms, some of which may be quite different from the disclosed illustrative embodiments. However, specific structural and functional details disclosed herein are merely representative and in that regard provide a basis for the claims herein which define the scope of the invention.

Some preliminary comments in relation to correlation are deemed pertinent. Generally, crosscorrelation involves measuring the similarity between two non-identical waveforms, e.g., $x(t)$ and $y(t)$ in different time relationships. The crosscorrelation time function is defined as: correlation function is a plot of $R_{xy}$ $$R_{xy}(\tau) = \overline{x(t-\tau)y(t)}$$

That is, $R_{xy}(\tau)$ is the crosscorrelation between the waveforms $x(t)$ and $y(t)$ at a delay or time displacement of $\tau$, where the bar indicates taking an average. Thus, there are three specific operations involved: delaying $x(t)$ by an amount $\tau$, multiplying the delayed $x(t)$ by the current value of $y(t)$, and taking the average value of these products over some interval of time. The resulting correlation function is a plot of $R_{xy}(\tau)$ versus the delay, $\tau$.

Referring initially to FIG. 1a, the curve 12 represnets a typical crosscorrelation function resulting from a particular signal $x(t)$ (as a reference signal) and an altered-form signal $y(t)$ (delayed but with added distortion and noise superimposed so that in fact two non-identical signals are involved). The peak of the curve 12 occurs at the time delay $\tau$ between the two signals and constitutes the maximum correlation of all frequencies. For repetitive signals, the correlation peak is repeated at delay intervals equal to the period of the input signal.

The broad skirts 14 and 16 of the correlation function of the curve 12 are due to the presence of a significant quantity of low frequency components in the signals $x(t)$ and $y(t)$. Generally, the present system utilizes these physical properties of the correlation function to accomplish various operations. That is, the tracking system operates in real time, continuously monitoring two inputs and seeking the time delay that represents the maximum correlation between the two signals. The system simply provides a measurement of the amount of time delay for maximum correlation.

Referring to FIG. 2, a somewhat generalized block diagram of the tracking system is depicted and will now be considered. Two signals, $x$ and $y$ are applied respectively to inputs 18 and 20. Generally, the system, as depicted in FIG. 2, is somewhat hybrid in that the signal $x$ is converted to a digital form for incurring various delays (storage) then subsequently converting the delayed signals back to analog forms for summing, weighting and combination, after which the resulting analog signal is multiplied by the signal $y$.

Considering the system in greater detail, the signal $x$ is applied from the input 18 through an amplifier 22 to an analog-to-digital converter 24. Generally, the periodic (sampled) conversion may involve considerable quantization as true analog values must only be approximated. For example, in digitizing a sample of the signal $x$, it may be quantized to a few bits, e.g., two or three. A variety of analog-digital converters are well known in the prior art to accomplish the function of the converter 24.

The digital output from the converter 24 (cyclic) is applied to a digital delay line 26, which may comprise a plurality of interconnected digital register stages stepped by a clock signal received through a conductor 28 which also cycles the converter 24. The delay line is tapped at predetermined intervals to provide five time-displaced digital output signals on lines D1, D2, D3, D4 and D5. Essentially, if the delay line 26 comprises a stepping-register structure, the output lines D1—D5 may be simply connected to provide signals from certain predetermined stages in the structure.

The lines D1 through D5 are connected through digital-to-analog converters 30 to provide analog representations to a summing and weighting circuit 32 through lines A1, A2, A3, A4 and A5. Essentially, the analog signals received through the lines A1—A5 are accorded various weights and summed in an additive fashion to provide a single composite signal through a conductor 34 to a multiplier 36. The other input to the multiplier 36 simply comprises the signal $y$ which is received from the input 20 through an amplifier 38. The output from the multiplier 36 (comprising a correlation function) is supplied through a loop filter 40 and a voltage controlled oscillator 42 to provide an output signal at a conductor 44, as well as to clock the delay line 26 and synchronize the converter 24 through the conductor 28.

Pursuing the operating philosophy of the system, as indicated above, the delayed digital signals representative of the signal $x$ are entered in the delay line 26 to appear at intervals of progressively increasing delay on the lines D1, D2, D3, D4 and D5. These delayed signal sets are supplied (in analog form) through the lines A1—A5 to a summing and weighting unit 32. By selectively weighting and summing these differently delayed signals, an aggregate or composite signal is produced. Again, as indicated above, that composite signal is multiplied by the signal $y$ (supplied through amplifier 38) by the multiplier 36. The output from the multiplier 36 (representative of the product) then is averaged by the loop filter 40 used as a control signal for the voltage controlled oscillator 42 which in turn controls the delay incurred by the delay line 26. In that manner, the frequency of the oscillator 42 is adjusted to bring the peak of the correlation function to a predetermined tap (for example, the midpoint tap) in the delay line. That is, the delayed signal $x$ at the tap D3 is in phase with the signal $y$. By multiplying the delayed signal $x$ by the signal $y$, and then averaging the product, the peak correlation value is obtained.

Referring to FIG. 1b, the time-offset signals (after weighting) are represented by the dashed-line curves 50, 52, 54, 56 and 58. Pursuing the example indicated above, that the signal on the central tap A3 (represented by the waveform curve 54) coincides to the signal $y$, in the weighting, it attains the highest amplitude. It may, therefore, be seen that if the dashed-line curves 50, 52, 54, 56 and 58 (representing the delayed signals $x$) are summed, then the result is miltiplied by the signal $y$, a correlation characteristic curve (FIG. 1a) will result. As indicated, the operation of the oscillator 42 then is varied to maintain the signal $y$ (represented by the curve 60) coincident with the waveform 54.

Supplemental to the basic configuration described with reference to FIG. 2, there are many features that can be added to enhance the system operation, prevent redundant modes, and increase the output information content. These features are largely application dependent and are considered as peripherals. Among such applications one of primary significance is the flowmeter. In that regard, the tracking system is utilized in cooperation with two or more sensors which observe a flow or stream at spaced-apart locations. The signals observed from the sensors are then processed in accordance with the system described above, to manifest the delay, as by a readout device 45, between detected similarities. Of course, on the basis of the knowledge of the physical displacement between the sensors and the period required for flow therebetween, the velocity is established.

In such an application, operation of the tracking system is based on the existence of minute variations in the flow stream which provide the signals $x$ and $y$ when sensed at two locations along the flow stream. The flow variations can be variously sensed, and take various forms. For example, turbulence may be sensed by anemometer type devices, density variations may be sensed by capacitance electrodes, acoustic absorpiton variations may be sensed ultrasonically and so on. In the event that such variations are not inherently present, they might well be induced. Specifically, turbulence can be induced by an abrupt change in the duct geometry or an object in the flow stream. Thus, the resultant turbulence would be sensed at two downstream locations. Of course, other alternatives include thermal pulses, ionization and gases, gas bubbles and so on introduced for subsequent detection.

Specifically, referring to FIG. 3, there is shown a duct 70 for carrying fluid flow through a distance d, the bounds of which are defined by a pair of sensors S1 and S2. Generally, the sensors may take a variety of different forms including ultrasonic units and capacitance units. Each sensor produces a random output signal that is related to fluctuations in the flow medium. A portion of the fluctuations seen at the sensor S1 are subsequently seen at the sensor S2. In that regard, the time (delay) is: $T = d/v$. Considering a specific example, in a twelve inch diameter tube, with a spacing of six inches between the sensors S1 and S2, the longest steady-state delay $T(\max)$ is: 0.5 feet/2 feet/sec. = 0.25 second. The shortest steady-state delay is: $T(\min) = 0.5$ feet/200 feet/sec. = 0.0025 second.

In using a correlation flowmeter in accordance herewith, on the basis of five hundred steps to correlate the peak, the frequency output for $T(max)$ is 2 KHz and the frequency output for $T(min)$ is 200 KHz. Assuming that a change of plus or minus 50 feet/second occurs at the 200 foot/second steady-state flow, the frequency modulation is plus or minus 25 percent, or plus or minus 50 KHz. Consequently, resolution of 0.01 foot/second is equal to 10 Hz, which can be conveniently read on a digital frequency meter.

Considering the detailed physical hardware involved in the flowmeter, the sensors S1 and S2 may for example each comprise a pair of capacitor plates affixed in opposed locations on the duct 70, and which operate on the basis that the field between the plates of each sensor is modulated by varying the dielectric of the media, as by turbulence, thermal gradients, cavitation bubbles and so on. The capacitance sensors detect the fluctuating capacitance and provide a randomly varying output signal. Of course, various features as automatic gain control may be employed to accomplish sufficient information content for the input to the flowmeter system 72.

In the operation of the flowmeter system 72 as indicated above, the inherent output is a signal of variable frequency. That is, the sensors S1 and S2 may be set at locations so as to cause the frequency to read directly in the units of interest, e.g., feet per second, gallons per hour and so on. Of course, a simple digital frequency counter may be employed for readout or the frequency may be converted to an analog voltage and read by a voltmeter.

Referring now to FIG. 4, the structure of a detailed system will be considered. The sensors S1 and S2 are indicated for supplying signals that are applied to a pair of amplifiers 74 and 76, respectively. Generally, on the basis of an assumed flow left to right, the signal from the sensor S1 is variously time delayed for comparison with the signal from the sensor S2 to determine the flow interval. In that regard, the signal from the amplifier 74 is applied to an analog-to-digital converter 80, the digital output from which is supplied to an interconnected series of delay circuits C1, C2, C3 and C4. After involving predetermined delays in the received signal in accordance with a synchronizing clock (received through a line 84 and also coupled to the converter 80) the delayed digital signals are converted back to analog forms by converters K1, K2, K3 and K4. The individual signals are then multiplied by the signal from the sensor S2 in series of multipliers M1, M2, M3 and M4. The output signals from the multipliers M1-M4 are averaged by individual averaging circuits G1, G2, G3 and G4, the outputs from which are arithmetically combined to derive a control signal for a clock generator 90 which supplies synchronizing clock to the conductor 84. Specifically, the output signals from the averaging circuits G2 and G3 are subtractively combined by a difference circuit 92 while th output signals from the averaging circuits G1 and G4 are similarly combined by a difference circuit 94. The outputs from the difference circuits 92 and 94 are additively combined in a summing circuit 96 the output of which is applied to a voltage controlled oscillator 98. The clock generator 90 is controlled directly by the voltage controlled oscillator 98, the output from which also is supplied through a buffer 100 to a frequency converter 102, to provide an output that may be scaled to provide a direct indication of flow velocity.

In the operation of the system, the delays provided by the circuits C1, C2, C3 and C4 are selected for critical monitoring at points on the correlation curve. Specifically, the delays C1, C2 and C4 may have a scale of fifty while the delay C3 has a scale of four. Consequently, when the clock frequency is correctly adjusted, the correlation curve (FIG. 1c) will be monitored at points A, B, C and D. Essentially, the averaged crosscorrelation functions at A and D are subtracted from each other while similarly the averaged crosscorrelation functions at B and C are similarly subtracted. These two differences are then summed by the summing circuit 96 to accomplish the desired control voltage for the clock repetition rate. The operation is graphically explained by FIG. 1d. As indicated above, when the clock frequency is adjusted correctly, the composite correlation curve will be centered between abscissa locations B and C (A and D as well) as indicated by a curve 110. If for example, the flow rate should change so that the curve is displaced to the location of the curve 112, it may be seen that a requirement exists to increase the frequency (shorten the delay time) and in that regard the ordinate values at abscissa locations B and C are such that B is greater than C. In this instance, that difference is detected by the difference circuit 92 and applied to the summing circuit 96 to restore the clock generator 90 to an appropriate frequency. On the contrary, if the need arises to decrease the frequency (lengthen the delay time) a curve 114 (FIG. 1d) appears, in which situation the ordinate values at B and C are such that C exceeds B and appropriate control again occurs.

The differences between the values of B and C override the small differences between the values at A and D to accomplish critical clock control. However, if the system is far out of correct adjustment (as at turn on) the values at A and D (FIG. 1c) will drive the clock frequency in the proper direction. That is, the "A minus D" signal provided from the difference circuit 94 will drive the clock frequency in the proper direction.

In view of the fact that the ability of the system to track over a wide range is somewhat dependent upon the shape of the correlation curve, it is sometimes necessary to provide additional correlation points. For example, an additional correlation point prior to point A would be a safeguard against rapid increases of flow initiated from a stagnant condition. Of course, additional correlation points may be readily provided if desired. It may thus be seen that a system is provided that is independent of the physical properties of the fluid and does not disrupt the flow. Additionally, the flowmeter may be effectively used in extreme environment situations, as in dealing with cryogenic fluids.

In addition to the applicability of the present system to the function of a flowmeter, other applications are apparent. For example, the system may be applied as a velocity meter as to sense the movement of a vehicle in relation to ground surface. In another application, the system may be employed to identify specific objects in accordance with a comparison as indicated above. System testing is another application for the present invention. Of course, various specific forms of the system may be embodied depending upon objectives and additionally the system may be employed in various applications. Accordingly, in general, as indicated above, the scope hereof shall be as set forth in the claims below and shall not relate to the specific embodiments disclosed herein.

What is claimed is:

1. A tracking system for time-displaced signals comprising:
   a variable-delay tapped digital means;
   means for providing a set of digital signals representative of one of said time-displaced signals;
   means coupling said set of digital signals to said variable-delay tapped digital means to provide delayed digital representations;
   means for correlating said delayed digital representations with another of said time-displaced signals by combination, and for controlling said variable-delay tapped digital means to attain maximum correlation by incurring a specific time delay; and
   means responsive to that means for correlating and controlling for manifesting said delay.

2. A system according to claim 1 wherein said one signal and said other signal are representative of a fluid stream observed at spaced-apart locations and said means for manifesting comprises means for indicating rates of fluid flow.

3. A system according to claim 1 wherein said means for correlating includes:
   means for combining said delayed digital representations with said other of said time-displaced signals to provide a control signal;
   a variable oscillator means coupled to receive said control signal for providing a variable-frequency signal; and
   means for coupling said variable-frequency signal to said variable-delay tapped digital means for regulating the delay incurred thereby.

4. A tracking system according to claim 3 further including a first sensor to sense one signal from a fluid stream at one location as one of said time-displaced signals and a second sensor to sense another signal from said fluid stream at another location as said other of said time-displaced signals whereby said means for manifesting indicates rates of flow.

5. A tracking system according to claim 4 wherein said means for correlating includes digital-to-analog means.

6. A tracking system according to claim 1 wherein said means for correlating includes means for arithmetically combining said delayed digital representations and said other time-displaced signal to provide a control signal for said variable delay means.

7. A tracking system according to claim 6 wherein said means for combining includes means for multiplying said delayed digital representations and said other time-displaced signal.

8. A tracking system according to claim 1 wherein said means for correlating includes a digital-analog converter means.

* * * * *

PO-1050
(5/69)

UNITED STATES PATENT OFFICE
CERTIFICATE OF CORRECTION

Patent No. 3,819,919  Dated June 25, 1974

Inventor(s) R. McGunigle

It is certified that error appears in the above-identified patent and that said Letters Patent are hereby corrected as shown below:

Col. 2, line 36, "correlation function is a plot of $R_{xy}$" should be deleted.

Col. 2, line 48, "represnets" should be --represents--.

Col. 5, line 38, after "flow" --from-- should be inserted.

Col. 5, lines 44-45, "involing" should be -- invoking --.

Col. 5, line 59, "th" should be --the--.

Signed and sealed this 24th day of September 1974.

(SEAL)
Attest:

McCOY M. GIBSON JR.           C. MARSHALL DANN
Attesting Officer             Commissioner of Patents